United States Patent [19]

Faulkner

[11] Patent Number: 4,732,926

[45] Date of Patent: Mar. 22, 1988

[54] DRY BLENDABLE POLYPROPYLENE COMPOSITION

[75] Inventor: Douglas L. Faulkner, Oak Park, Mich.

[73] Assignee: General Motors Corporation, Detroit, Mich.

[21] Appl. No.: 912,404

[22] Filed: Sep. 29, 1986

[51] Int. Cl.[4] ............................ C08K 3/34; C08L 47/00
[52] U.S. Cl. ..................................... 524/449; 524/525; 525/86; 525/232
[58] Field of Search ......................... 524/449, 904, 525; 525/86, 232, 240, 934

[56] References Cited

U.S. PATENT DOCUMENTS 4,229,504  10/1980  Brachman ........................... 428/461
4,259,230  3/1981   Simons ............................. 260/42.46

FOREIGN PATENT DOCUMENTS 0038449  2/1985  Japan .

*Primary Examiner*—Theodore E. Pertilla
*Attorney, Agent, or Firm*—R. W. Tung

[57] ABSTRACT

A high impact dry blendable polypropylene composition filled with mica and reinforced with an impact modifier of ethylene-propylene-diene monomer rubber/high density polyethylene.

2 Claims, No Drawings

DRY BLENDABLE POLYPROPYLENE COMPOSITION

FIELD OF THE INVENTION

The present invention generally relates to a dry blendable polypropylene composition and, more particularly, is concerned with a high impact dry blendable polypropylene composition filled with mica and reinforced with an impact modifier of ethylene-propylene-diene monomer rubber/high density polyethylene.

BACKGROUND OF THE INVENTION

Polypropylene is a very desirable material because of its low cost and good physical properties. In many applications, the stiffness of polypropylene must be improved by the addition of a reinforcing filler such as mica. Mica is a suitable reinforcing filler because of its good properties and its low cost which further reduces the cost of a mica-filled polypropylene compound.

A drawback encountered in using a mica-filled polypropylene is the low impact property of the material. By adding mica, the stiffness of the material is improved at the expense of its impact properties. It is known that the impact properties of polypropylene may be improved by blending with an ethylene-propylene-diene monomer (EPDM) rubber. However, this rubber component must be carefully added to the total composition in order not to sacrifice substantially the stiffness or the flexural modulus properties.

In compounding a polypropylene composition containing both a mica filler and an impact modifier rubber component, a melt extrusion and pelletizing operation is normally required. Due to the dissimilar shapes and forms of the raw material involved, i.e., the rubber and the polypropylene are generally in the form of pellets while mica is in powder form, a homogeneous blend of the composition is not possible unless it is compounded in a melt extrusion process where extensive mixing is possible for the polymers in their molten state. A melt extrusion process produces a three component polypropylene composition in rod form. The rods are then chopped into pellets to be used in subsequent injection molding processes to make the end product. This intermediate processing of a mica filled, rubber modified polypropylene composition contributes to a substantial portion of the total cost of the blended material. All commercially available mica-filled, impact modified polypropylene compositions are prepared by the melt extrusion and pelletizing method and therefore making it a high cost material. The high cost of these commercially available materials making polypropylene less competitive with other low cost thermoplastic materials such as polyvinyl chloride and polyethylene.

It is therefore an object of the present invention to provide a mica-filled, impact modified polypropylene composition which can be compounded in a dry blending operation to be used in an injection molding process directly without the melt extrusion and pelletizing operations.

It is a further object of the present invention to provide a mica-filled, impact modified polypropylene composition which is dry blendable and has superior stiffness and impact properties.

SUMMARY OF THE INVENTION

In accordance with a preferred embodiment of my invention, a dry blendable mica-filled, high impact polypropylene composition can be compounded and injection molded into plastic articles without the intermediate step of melt extrusion and pelletizing operation. This dry blended polypropylene composition can be used directly in an injection molding process to mold plastic articles having superior stiffness and impact properties.

My novel invention is made possible by the use of three components in their unique physical forms. The first component in my novel composition is a polypropylene homopolymer in a powder form, instead of pellets, having a unique particle size distribution. This unique particle size distribution is important in my total composition such that it will blend readily with the other components of my unique composition without separation.

The second major component in my novel invention is a mica filler having untreated surface and a specific particle size distribution. The particle size distribution of this mica-filler is carefully selected such that it will blend with polypropylene powder into a homogeneous blend without separation. The use of a non-surface treated mica not only saves costs, but also improves the impact strength of the resulting compound.

The third component in my novel invention is an impact modifier of EPDM rubber. The uniqueness of this EPDM rubber is that it is a coblend of EPDM rubber and a high density polyethylene. The high density polyethylene component of the coblend greatly improves the dry blendability of this impact modifier and avoids the congregation which would otherwise occur with pure rubber pellets. This unique coblend impact modifier is carefully selected such that it blends well with the mica and polypropylene powder without any segregation.

My novel composition of mica-filled, high impact polypropylene can be easily compounded in a simple dry blending process. It completely eliminates the melt extrusion and pelletizing operations which would otherwise be necessary with other mica-filled high impact polypropylene compositions. The dry blending process also eliminates the breakage of mica particles which would otherwise occur in an extrusion/pelletizing operation. This leads to a compound of improved flexural modules.

My novel composition can be dry blended in a simple mixing device such as a barrel tumbler in a short mixing time of several minutes.

DETAILED DESCRIPTION OF THE INVENTION

These and other objects, features, and advantages of the present invention will become apparent in the following detailed descriptions.

According to the present invention, a mica-filled, high impact polypropylene composition that can be compounded by the dry blending method is formulated by three major components. The first major component is between 49 to 93 wt % of the total composition, a polypropylene homopolymer in a powder form. This polypropylene powder has a midpoint particle size distribution at between 30 to 40 mesh, and 1% below 200 mesh. The particle size distribution of the polypropylene powder is of critical importance. I have found that in order to achieve a homogeneous blend in a dry blending process, the particle size of the polypropylene powder must match those of the mica particle. When one particle size is much different than the other particle size, a poor mixing caused by the precipitation of one component from the other component will occur. The polypropylene powder I used was obtained from the Himont U.S.A., Inc., under the tradename of Profax 6523 PM. This polypropylene material has a weight average molecular weight of 300,000 and a polydispersity index of (PDIN) of 6 to 7.

The second major component used in my novel composition is mica which is used in a weight percent of the total composition between 4 to 30. The specific mica material I have used has the following mesh size.

+40 mesh smaller than 1%
−40 mesh +100 mesh 75 to 99%
−100 mesh +200 mesh 1 to 20%
−200 mesh +325 mesh 1 to 5%
smaller than 325 mesh 1 to 5%

This mica filler material is commercially available from Marietta Resources International Ltd. It is sold under the tradename of Suzorite® Mica 60-S. It is a highly delaminated, pure phlogopite mica flake. It has low microwave absorption, low specific heat and high thermal conductivity. It is an inert mineral having good electrical properties. The bulk density of this mica material is between 10 to 18 lb/ft$^3$.

The percentage range of this mica filler I have used in my novel composition is between 4 to 30 wt % of the total composition. At below 4 wt %, no improvement in the stiffness of the composition was noticed. At percentages higher than 30 wt %, the increase in stiffness was too high at the expense of sacrificing impact properties. This mica filler was not treated with surface coupling agent. I have found that surface treatment of mica fillers was not necessary in my novel compositions for two reasons. First, the untreated mica-filler is lower in cost and, secondly, the impact property of the resulting composition is better when untreated mica filler is used.

The third major component in my novel composition is an impact modifier. Instead of using a pure rubber based impact modifier, I have used an impact modifier which is a coblend of EPDM rubber and high density polyethylene. The unique surface property of this coblend material contributes greatly to the dry blendability of my novel composition. Since the surface frictional coefficient of my coblend pellets is much lower than that for a pure rubber pellet, the pellets do not tend to congregate in a dry blending process. A uniformly distributed impact modifier pellets in a median of powdery material (polypropylene and mica) is therefore achieved. The high density polyethylene component of this coblend impact modifier further improves the thermal stability of my novel composition. The EPDM/high density polyethylene coblend impact modifier I used in my novel composition is commercially available from the Uniroyal Chemical Co. It is sold under the tradename of Royalene® IM 7565. It has a composition of 65% EPDM rubber and 35% high density polyethylene. It has a specific gravity of 0.89 and a melt-flow index of 1 gram per 10 minutes (ASTMD-1238 test at 230° C. and 2160 gram loading). It is normally sold for extrusion blending with other thermoplastics. I have found that the unique surface characteristics of this rubber coblend lends itself to dry blend with powders of polypropylene and mica.

The following are 16 sample compounds and their physical properties. All compositions are obtained by tumble blending the components together in a 4 liter metal container containing lateral blades to aid mixing on a rolling mill. I have found that two minutes mixing time is adequate when mixing is conducted at room temperature and at a speed of 60 rpm.

Composition #1—This composition contains 63 wt % of polypropylene, 7 wt % of EPDM/high density polyethylene impact modifier and 30 wt % mica filler. The following physical properties were obtained on samples that were dry blended and then injection molded directly into standard test bars.

TABLE 1

| | |
|---|---|
| Peak tensile stress (D-638) | 21.4 MPa |
| Tensile modulus (D-638) | 3490 MPa |
| Elongation (D-638) | 15.7% |
| Peak flexural stress (D-790) | 32.0 MPa |
| Flexural modulus (D-790) | 3020 MPa |
| Notched Izod Impact (D-256) | 81.7 J/M |
| Heat deflection temperature (at 1.58 MPa) | 73.1° C. |

Composition #2—This composition contains 56 wt % of polypropylene, 14 wt % of EPDM/high density polyethylene impact modifier and 30 wt % mica filler. The following physical properties were obtained on samples that were dry blended and then injection molded directly into standard test bars.

TABLE 2

| | |
|---|---|
| Peak Tensile Stress (D-638) | 19.6 MPa |
| Tensile Modulus (D-638) | 3230 MPa |
| Elongation (D-638) | 18.9% |
| Peak Flexural Stress (D-790) | 26.8 MPa |
| Flexural Modulus (D-790) | 2510 MPa |
| Notched Izod Impact (D-256) | 120.6 J/M |
| Heat Deflection Temperature (@ 1.50 MPa) | 69.9° C. |

Composition #3—This composition contains 66.5 wt % of polypropylene, 3.5 wt % of EPDM/high density polyethene impact modifier and 30 wt % mica filler. The impact strength (notched Izod) was determined on samples that were dry blended and then injection molded directly into impact test bars. The average notched Izod impact strength determined was 48.2 J/M.

Composition #4—This composition contains 49 wt % of polypropylene, 21 wt % of EPDM/high density polyethene impact modifier and 30% wt mica filler. The impact strength (notched Izod) was determined on samples that were dry blended and then injection molded directly into impact test bars. The average notched Izod impact strength determined was 139.7 J/M.

Composition #5 through #16—The effect of wt % mica on the physical properties of my novel dry blendable polypropylene composition was determined in these 12 compositions. In each of these composition, the wt % EPDM/high density polyethylene was varied between 3.5 to 19.2 wt % while the wt % of polypropylene was adjusted accordingly to make up the total composition. The wt % mica filled and the wt % EPDM/high density polyethylene used, the notched Izod impact strength in J/M (ASTM D-256), and the flexural modulus in MPa (ASTM D-790) obtained on these samples are shown in Table 3.

TABLE 3

| Composition No. | Wt % Mica | Wt % Rubber Coblend | Notched Izod (J/M) | Flex. Modulus (MPa) |
|---|---|---|---|---|
| 5 | 4 | 4.8 | 65.1 | 504 |
| 6 | 4 | 9.6 | 114.8 | 1342 |

TABLE 3-continued

| Composition No. | Wt % Mica | Wt % Rubber Coblend | Notched Izod (J/M) | Flex. Modulus (MPa) |
| --- | --- | --- | --- | --- |
| 7 | 4 | 14.4 | 193.2 | 1104 |
| 8 | 4 | 19.2 | 252.5 | 943 |
| 9 | 16.7 | 4.2 | 71.5 | 2209 |
| 10 | 16.7 | 8.3 | 99.3 | 1737 |
| 11 | 16.7 | 12.5 | 120.6 | 1651 |
| 12 | 16.7 | 16.7 | 154.0 | 1466 |
| 13 | 30 | 3.5 | 50.7 | 3148 |
| 14 | 30 | 7.0 | 67.3 | 2691 |
| 15 | 30 | 10.5 | 77.4 | 2515 |
| 16 | 30 | 14.0 | 92.3 | 2284 |

The embodiments of the invention in which an exclusive property or privilege is claimed are defined as follows:

1. A dry blended high impact polypropylene composition comprising essentially of
   3 to 21 weight percent of total composition in a coblend of ethylene propylene diene monomer rubber and high density polyethylene with said rubber being the major component,
   4 to 30 weight percent of total composition a reinforcing filler of mica having at least 60% of its particles in the size range between −40 mesh to +100 mesh,
   49 to 93 weight percent of total composition a polypropylene homopolymer in a powder form having a midpoint particle size distribution between 30 to 40 mesh,
   said particle sizes of mica matching said particle sizes of polypropylene in suca a way that after mixing in a mechanical mixer with said coblend of ethylene propylene diene monomer rubber and high density polyethylene without melting any of the three components a homogeneous blend is produced suitable for use in an injection molding machine.

2. The method of compounding an injection moldable dry blended high impact polypropylene composition by mixing together the components of 3 to 21 weight percent of total composition a coblend of ethylene propylene diene monomer rubber and high density polyethylene with said rubber being the major component, 4 to 30 weight percent of total composition a reinforcing filler of mica having at least 60% of its particles in the size range between −40 mesh to +100 mesh, 49 to 93 weight percent of total composition a polypropylene homopolymer in a powder form having a midpoint particle size distribution between 30 to 40 mesh, said particle sizes of mica matching said particle sizes of polypropylene in suca a way that after mixing in a mechanical mixing device with said coblend of ethylene propylene diene monomer rubber and high density polyethylene without melting any of the three components a homogeneous blend is produced suitable for use in an injection molding machine.

* * * * *